Figure 1:
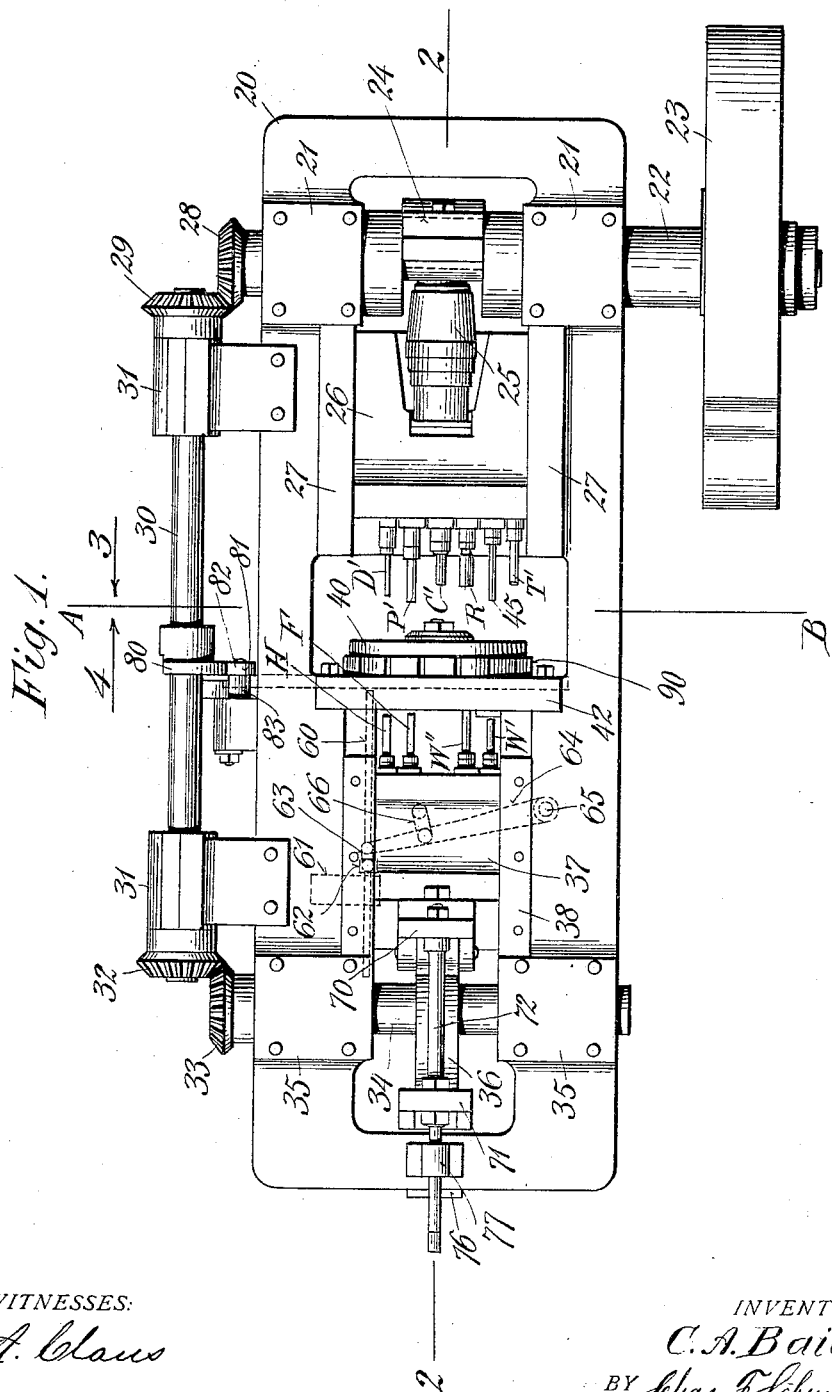

C. A. BAILEY.
MACHINE FOR MAKING CARTRIDGE SHELLS.
APPLICATION FILED SEPT. 23, 1910.

1,066,980.

Patented July 8, 1913.
5 SHEETS—SHEET 1.

WITNESSES:
E. A. Claus
Ed. E. Claussen.

INVENTOR.
C. A. Bailey,
BY Chas. F. Schmelz
ATTORNEY.

C. A. BAILEY.
MACHINE FOR MAKING CARTRIDGE SHELLS.
APPLICATION FILED SEPT. 23, 1910.
1,066,980.
Patented July 8, 1913.
5 SHEETS—SHEET 2.
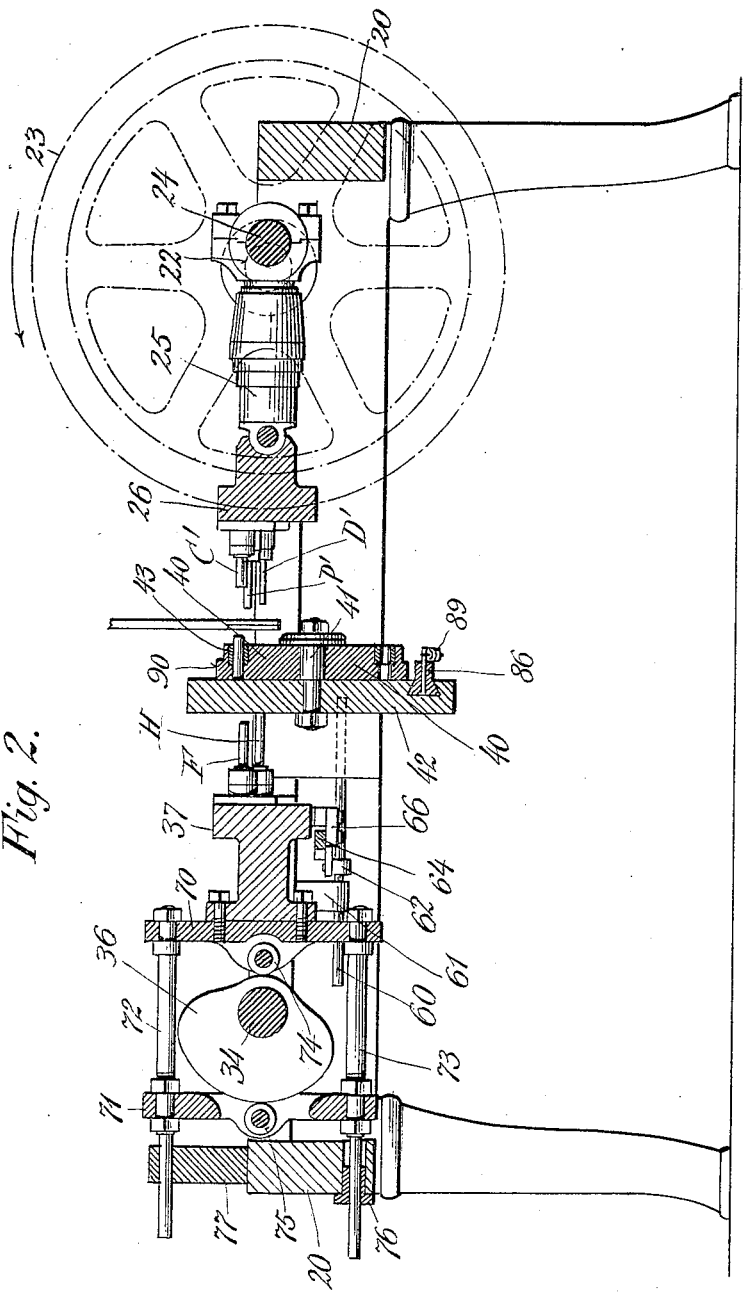
WITNESSES:
INVENTOR.
C. A. Bailey
BY Chas. F. Schmidt
ATTORNEY.

C. A. BAILEY.
MACHINE FOR MAKING CARTRIDGE SHELLS.
APPLICATION FILED SEPT. 23, 1910.
1,066,980.
Patented July 8, 1913.
5 SHEETS—SHEET 3.
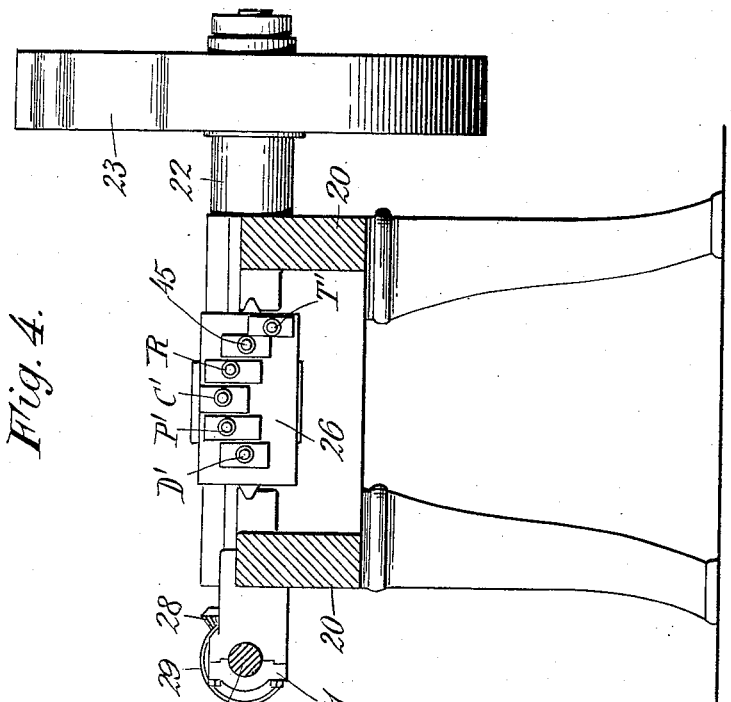
WITNESSES:
INVENTOR.
C. A. Bailey,
BY
ATTORNEY.

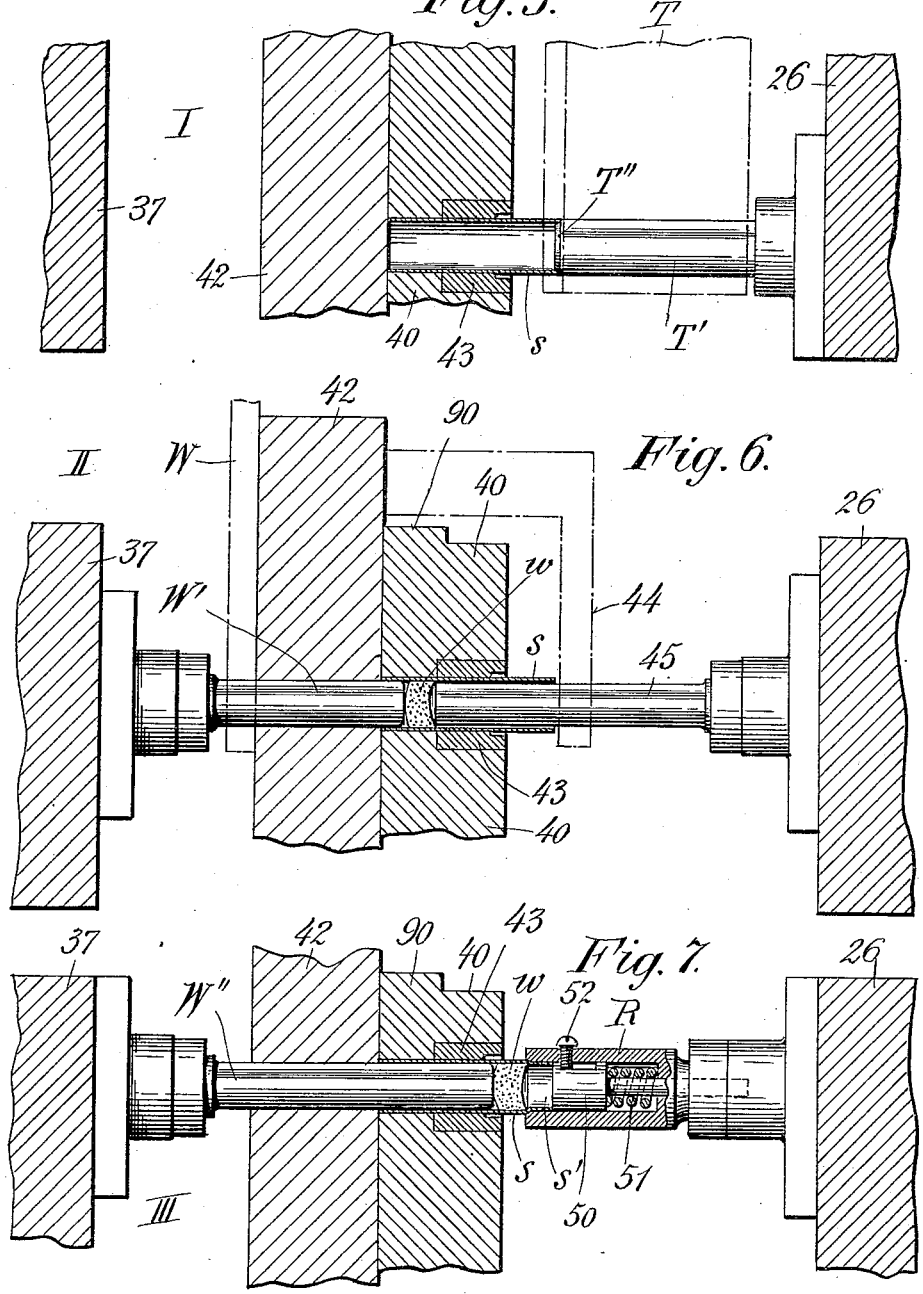

C. A. BAILEY.
MACHINE FOR MAKING CARTRIDGE SHELLS.
APPLICATION FILED SEPT. 23, 1910.
1,066,980.
Patented July 8, 1913.
5 SHEETS—SHEET 5.
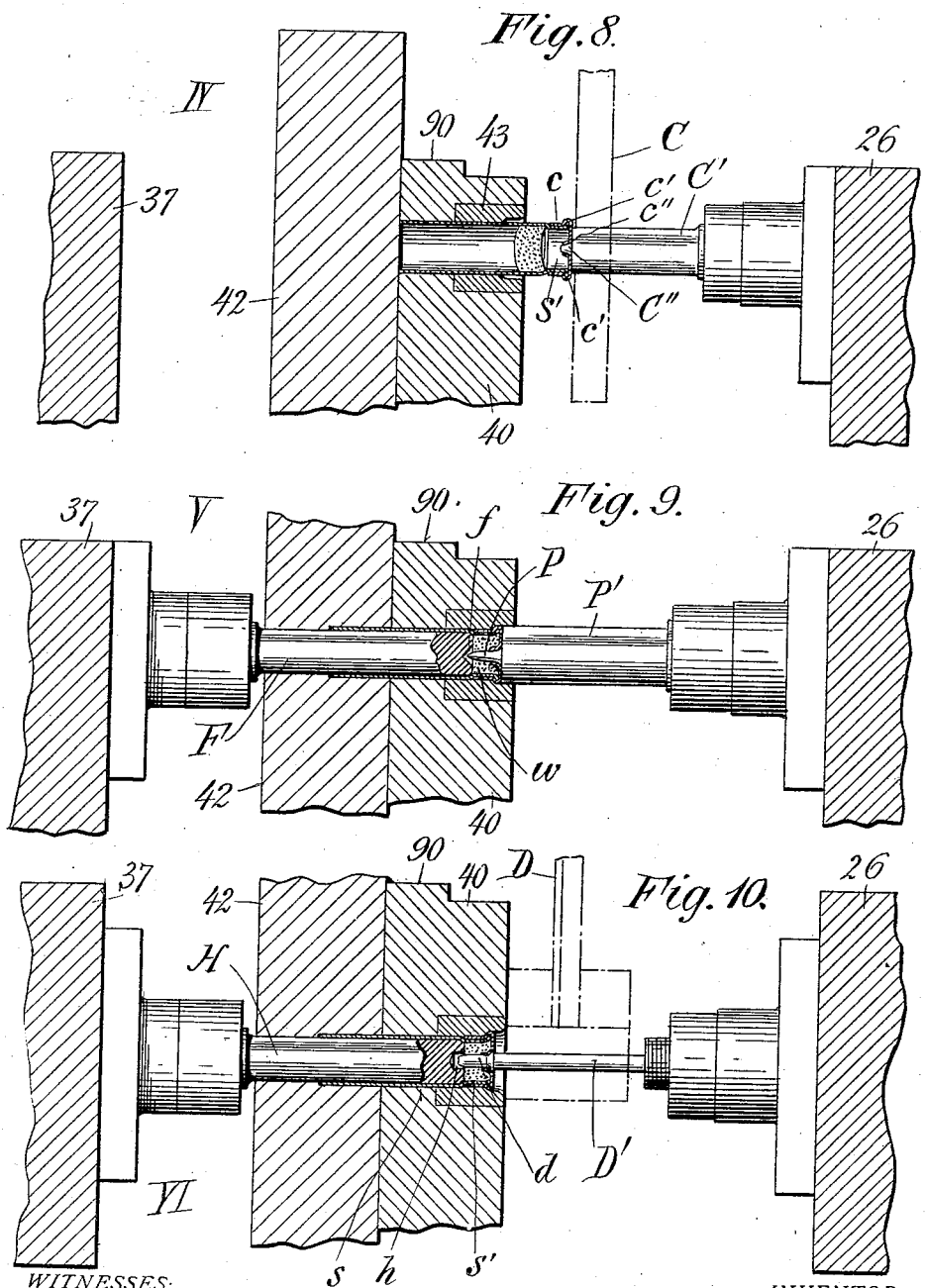
WITNESSES:
INVENTOR.
C. A. Bailey,
BY
ATTORNEY.

UNITED STATES PATENT OFFICE.

CHARLES A. BAILEY, OF CROMWELL, CONNECTICUT.

MACHINE FOR MAKING CARTRIDGE-SHELLS.

1,066,980.

Specification of Letters Patent.

Patented July 8, 1913.

Application filed September 23, 1910. Serial No. 583,386.

*To all whom it may concern:*

Be it known that I, CHARLES A. BAILEY, a citizen of the United States, and resident of Cromwell, in the county of Middlesex and State of Connecticut, have invented certain new and useful Improvements in Machines for Making Cartridge-Shells, of which the following is a full, clear, and exact specification.

This invention relates to machines for making cartridge shells, and more especially to that class thereof in which paper tubes or shells are wadded, capped, and primed, after which such shells are then ready to be loaded with powder and shot.

The invention has for one of its objects the provision of a machine of this character in which the several operations on the shell will be successively carried out without removing the paper tube from the carrier until the shell is complete in itself.

The invention has also for its object certain improvements in the mechanism whereby the several parts are operated to perform the functions above cited.

The invention has been clearly illustrated in the accompanying drawings in which similar characters denote similar parts and in which—

Figure 1 is a top view of a machine embodying my invention. Fig. 2 is a central longitudinal section thereof on line 2, 2 indicated in Fig. 1. Fig. 3 is a vertical cross section taken on line A, B of Fig. 1 looking in the direction of arrow 3. Fig. 4 is also a section taken on line A, B of Fig. 1, but looking in the direction of arrow 4, indicated in said figure. Figs. 5 to 10 inclusive illustrate on an enlarged scale the different steps which are employed to bring the cartridge shell into its finished condition, together with the tools employed therefor. Of these, Fig. 5 shows the first step, namely; that of seating a plain paper tube in the carrier. Fig. 6 illustrates the base-wad entered into the shell. Fig. 7 shows the base-wad in its position where it becomes operative to maintain the body of the tube expanded while the front end of the shell is being slightly decreased or crimped for the reception of the metal fulminate cap. Fig. 8 shows the cap in place on the end of the shell. Fig. 9 shows the base-wad pushed into place within the end of the shell, the cap being brought to the standard form and size. Fig. 10 shows the primer inserted, this last step bringing the shell into its complete condition ready for loading.

In brief, my improved machine comprises a carrier adapted to receive a number of paper tubes which are to be converted successively into primed cartridge shells. Proper feed chutes are provided to feed shells successively into position to be seated into the carrier; also for bringing base-wads consecutively in position to be inserted into tubes; also for bringing the metal fulminate caps into position to be pushed onto the shells; and also to bring primers into position to be inserted into the caps and wads. The present carrier has sixteen recesses adapted to receive paper tubes, and it is intermittently rotated step-by-step to bring each tube (after it has been entered into the carrier), into position to be successively operated upon by the various tools whereby the cartridge shell is finally completed. In other words, in the present instance there are seven different stations at each of which a certain function or operation is performed, namely:—At the first station, the tube is pushed from the supply-chute into the carrier; at the second station a base-wad is taken from the supply-chute and pushed partly into the shell; at the third station the base-wad is pushed into position near the cap-end of the shell to maintain the same expanded while at the same time the extreme end of the tube is crimped or reduced in diameter; at the fourth station a metal cap is removed from its chute and pushed onto the reduced extreme end of the shell; at the fifth station the base-wad is pierced for the reception of the primer and compressed, the rim of the cap being simultaneously brought to standard size and form; at the sixth station a primer is removed from its feed-chute and pushed into place through the head of the cap and also through the base-wad; at the seventh station the finished cartridge shell is ejected from the carrier. Inasmuch as the present carrier is provided with sixteen tube-receiving recesses and, furthermore, inasmuch as some of the stations follow very closely upon each other, or are adjacent to each other, it follows that the intermittent or step-by-step movement of the carrier should be equal to one sixteenth of one rotation, the carrier being stationary for a sufficient length of time to permit certain tools to perform their functions in regard to the shells, these tools being carried on slides or "gates" which move toward and away from each other to bring the tools carried thereby into coöperation, respectively.

Referring to the drawings, the numeral 20 denotes the bed of the machine having bearings 21 in which the main shaft 22 of the machine is journaled. This shaft has a flywheel 23 to which a belt may be applied, and it has also a centrally-disposed crank 24 which is connected (by an adjustable connecting rod 25) with a slide 26 guided in ways 27 on the bed of the machine. This slide carries a series of tools which are brought into operative relation with the several tubes in the carrier simultaneously during each rotation of the crank 24.

Secured to the rear end of the shaft 22, is a bevel gear 28 in engagement with a similar gear 29 secured on a longitudinal shaft 30 which is mounted in bearings 31 held on the bed of the machine. At its front end the shaft 30 has a bevel gear 32 in engagement with a similar gear 33, the latter being mounted upon one end of a cam shaft 34 which is journaled in bearings 35 of the bed plate and which carries a cam 36 whereby proper motion is imparted to a slide 37 guided in ways 38 of the machine bed.

The general organization of the slides 26 and 37 is such that they move toward each other simultaneously and become, therefore, coöperative in performing certain functions in connection with the shells contained in the carrier which is disposed between said slides. This carrier is herein designated by the numeral 40, and is mounted for rotation on a stud 41 (see Fig. 2) which is rigidly held in a vertically-disposed plate 42, firmly secured to the machine-bed, as clearly shown in Fig. 1. Arranged within the carrier 40 are a series of recesses (sixteen as above stated) which contain hardened bushings 43 (see Fig. 8) within each of which a tube is placed and retained until the cartridge-shell is complete.

By referring to Fig. 3, it will be seen that at station I a plain paper tube $s$ is fed through the chute T into position opposite the bushing 43 at that point, by a plunger T' secured to the slide 26, as is clearly shown in Fig. 5 in which the plunger is shown having a reduced front end T'' to enter and locate the end of the tube relatively to said plunger during the forward or inserting movement thereof. As now the slide 26 is retracted by virtue of the crank 24, the carrier 40 is rotated one step, thus bringing the tube $s$ to station II, where the base-wad $w$ is pushed from the tube W for a short distance into the rear end of the tube which is held in its position within the bushing 43, as for instance by a holder or stop bracket 44.

The tool employed for pushing the wad into place is herein designated by the numeral W', and is carried by the slide 37; while a follower 45 carried by the slide 26 may be employed to maintain the wad $w$ in its straight position within the tube $s$. While under ordinary circumstances the tube $s$ is not liable to leave its place within the carrier 40, advantage may be taken of the two tools W' and 45 to slightly compress the primarily crowned wad so as to expand the tube at that point and thus hold the same frictionally within the carrier. In other words, the tube would be crowded at that point and, furthermore, the wad would be more apt to remain in its place shown in Fig. 6. The next partial rotation of the carrier 40 will bring the tube $s$ with its wad to station III (see Fig. 7), where the wad $w$ is pushed toward the front end of the tube $s$ by a plunger W'' secured to the slide 37, this advance movement of the wad bringing the latter into such position that the front of the tube $s$ near its extreme end will be maintained in its expanded or full size condition, while the extreme end $s'$ (see Fig. 7) will be reduced or crimped so as to be ready for the reception of the metal primer-cap of the shell. The crimping or reducing operation is performed by a crimping tool R secured to the slide 26 and comprising a cylindrical shell, the bore of which is substantially equal to the reduced size of the tube-end. Mounted within the tubular shell R, is a follower 50 which is normally forced outward by a spring 51 to prevent the tube $s$ from being pulled out of its place within the bushing 43 by the friction between the crimping shell R, and the tube end $s'$ when the slide 26 is retracted. The outward movement of the follower 50 is preferably limited by a screw 52 clearly shown in Fig. 7. From the foregoing, it will be understood that the inside diameter of the tube $s$, or more particularly speaking of that of the front end $s'$, is naturally slightly less than that of the main body of the tube $s$. The next partial rotation of the carrier 40 will bring the now reduced tube to station IV at which point the cap chute C is located, and where a plunger C' secured to the slide 26 (see Fig. 8) will become instrumental in pushing a metal cap $c$ onto the reduced end $s'$ of the tube $s$. It will be noted that in the condition shown in Fig. 8, the cap $c$ has a bead $c'$ as it was previously formed in a blanking machine, or in other words "open." Furthermore, the metal cap $c$ may have its central portion punched inwardly as shown at $c''$ so as to adapt the same to receive the button-projection C'' of the plunger C'. This will insure the cap $c$ being positioned centrally to the plunger C'. The next partial rotation of the carrier 40 will bring the now capped tube to station V at which point the wad w will be forced into the capped end of the shell by a forcer F which is provided at its end with a central recess f to clear the end of an awl point P which may be secured to, or form a part of, a piercing tool P' secured to the slide 26, while the forcer F is secured to the slide 37. The piercing tool P' also serves to move the shell tube s bodily rearward so as to bring the cap into a recess provided in the front end of the bushing 43, it being understood that the back-plate 42 is counterbored sufficiently to receive the rear end of the tube s, as is shown in Fig. 9. Furthermore, at this station the heretofore open bead of the cap is now closely compressed and brought to standard size by virtue of the recess in the bushing 43, this compressing motion on the wad and the cap body resulting in firmly uniting the base-wad and the cap-end of the shell together. In the present instance I form the base of the piercer P conical to correspond with the head of the primer which is to be inserted at station VI, illustrated in Fig. 10.

Inasmuch as the tube is carried from station V to the ejector-station (VII) in the arc of a circle concentric with the point of rotation of the carrier (stud 41), and the tube remains in its position in the carrier during that time, and until finally ejected from the carrier at station VII, the back-plate 42 is circularly grooved between stations V and VII so as not to interfere with the arcuate or revolving movement of the tube, (see dotted lines g in Fig. 3).

At station VI primers are consecutively fed through the chute D into position opposite the plunger D' which is secured to the slide 26 whereby a primer is moved from the chute D and forced into place in the base-wad as clearly shown in Fig. 10. In order to prevent the base-wad from being pushed backward within the shell s by the insertion of the primer d, I deem it advantageous to employ a backing tool H which is secured to the slide 37 and has at its front end a recess h whereby interference with the insertion of the primer from the front end will be prevented, it being understood that the inner end of the primer d extends slightly beyond the inner face of the wad so that it may coöperate with the powder filling of the shell.

Referring to Fig. 3, it will be seen that it would require three partial rotations of the carrier 40 to bring the tube or now finished shell from station VI to station VII at which point the shell is ejected from the carrier by a mechanism shown in Figs. 1 and 2 of the drawings. Here it will be seen that at station VII, I have provided a rod 60 guided for longitudinal movement in the bed 20 and also in a bearing 61 secured to the bed. The rod carries a collar 62 which is connected by a link 63 with a lever 64, pivoted at 65 on the bed of the machine and connected at a point intermediate its ends by a link 66 with the slide 37, whence it follows that the movement of the ejector rod 60 occurs simultaneously with that of the slide 37, but for a greater distance than that of the latter, which distance is commensurate with the requirements properly performing that function.

While the movement of the slide 26 is entirely controlled by the crank 24, the movement of the slide 37 is, as has been previously stated, under the control of a cam 36 (see Fig. 2). The rear end of the slide 37 carries a yoke consisting of the upright parts 70 and 71 connected by guide rods 72, 73 and carrying rollers 74, 75 respectively, which are in engagement with opposite sides of the cam as clearly shown, the entire yoke being guided in a bushing 76, and also an extension of upright 77 attached to the bed 20.

The manner in which the carrier 40 is intermittently rotated so as to bring the tube successively to the several stations above mentioned, as clearly shown in Figs. 2 and 3, in which the shaft 30 is shown having a cam 80 in engagement with a roller 81 journaled on a stud 82 of a lever 83 which is fulcrumed on a bracket 84 secured to the bed of the machine, and the lower end of which is connected by a link 85 with a transversely-movable slide 86 guided within the back-plate 42 above mentioned. Pivoted on the slide, as at 87, is a dog 88 having attached thereto a spring 89 which serves to hold the free end of said dog into engagement with the notched circumferential surface 90 of the carrier 40 so that when the slide 86 moves toward the left, as seen in Fig. 3, the carrier 40 will be rotated in the direction of arrow a for the amount of one-notch distance.

Means are provided for retaining the carrier 40 in its position during the time that the several tools described above are operative on the shell blanks in the carrier 40. These means consist preferably of a spring-actuated detent shown herein in the shape of a slide 91 guided for longitudinal movement in a bracket 92 secured to the back-plate 42.

The slide 86 carries a cam-plate 93, the front face of which is slightly beveled (as shown at 94), and adapted to engage a lug 95 carried on the detent 91, so that when the slide 86 moves from left to right, as shown in Fig. 3, the cam-plate 93 will have moved the detent out of engagement with the carrier 40, and the latter is, therefore, free to be rotated by the reverse movement of said slide 86. This reverse movement will remove the cam-surface 94 from the lug 95, and the detent will, therefore, ride on the peripheral surface of the carrier until the latter has been rotated sufficiently to bring the next notch thereof into position to be engaged by said detent so that the latter will then enter such notch and hold the carrier stationary during the operation of the slides 26 and 37.

It will be noted that the cam 80 moves the lever 83 only in one direction, it being understood that suitable means, such as a spring 96, may be employed for holding the cam-roller 81 against the cam and at the same time move the slide 86 from right to left. By virtue of this construction, it is evident that the slide 86 is retracted by positive means, while the active movement of said slide is performed by the spring 96 which is naturally resilient, and, therefore, any liability of breakage of any of the parts during the feed movement of the carrier will naturally be avoided.

Many changes may be made in the particular construction and organization of the several elements coöperative in my improved machine, without departing from the scope of the invention as defined by the appended claims.

I claim:—

1. In a machine of the character described, the combination with a tube-supply, and a wad-supply, of a rotatable tube-carrier, means for partially rotating said carrier to bring a tube from the tube-supply into alinement with the wad-supply, means for pushing a wad from the wad-supply partially into said tube, and means engaging the other side of the wad and for slightly compressing the same within the tube to hold the latter frictionally in the carrier.

2. In a machine of the character described, the combination with a tube-supply, and a wad-supply, of a rotatable tube-carrier, means for partially rotating said carrier to bring a tube from the tube-supply into alinement with the wad-supply, means for pushing a wad from the wad supply into said tube, a stationary device for holding said tube in the carrier while said wad is being pushed in, and means engaging the wad for slightly compressing the same within the tube to hold the latter frictionally in the carrier.

3. In a machine of the character described, the combination with a tube-supply, and a wad-supply, of a rotatable tube-carrier, means for moving said carrier to bring a tube into alinement with the wad-supply, and means for pushing a wad into said tube, of a device for reducing one end-portion of the tube, means for rotating said carrier to bring a tube from the wad-supply into alinement with said reducing device, and means for actuating said device.

4. In a machine of the character described, the combination with a rotatable tube-carrier, a wad-supply, and means for pushing a wad into said tube and expanding it therein, of a device for reducing the end-portion of said tube, means for rotating the carrier to bring a tube into alinement with said reducing device, and means for actuating the reducing-device.

5. In a machine of the character described, the combination with a tube-carrier, a wad-supply, and means for inserting a wad into said tube, of a device for reducing the end of said tube, said device comprising a tubular shell having a bore slightly smaller than the body of said tube, means for moving said tubular shell toward the carrier, and means for maintaining the tube within the carrier during the retracting movement of said reducing-device.

6. In a machine of the character described, the combination with a tube-carrier, and means for reducing the end of the tube in the carrier, said means comprising a tubular shell having a bore slightly smaller than the body of the tube, of means for moving said tubular shell toward the carrier, a follower movable within said shell and adapted to engage the end of the tube during the forward movement of said shell, means for limiting the outward movement of the follower in the shell, and resilient means for forcing said follower outwardly during the retracting movement of the reducing means.

7. In a machine of the character described, the combination with a tube-carrier, a wad-supply, means for inserting a wad from the supply into said tube, means for expanding the wad in the tube to cause it to frictionally engage the carrier, and means for slightly reducing the end of the tube, of a cap-supply, a device for removing a cap from the supply and placing the same onto the reduced portion of the tube, and means for actuating said device.

8. In a machine of the character described, the combination with a tube-carrier, a wad-supply, a device for inserting a wad into a tube in the carrier, means for reducing the end of the tube, a cap-supply, and means for placing a cap from the cap-supply onto the reduced end portion of said tube, of a pair of devices engaging the opposite sides of the wad and cap respectively, and for compressing said wad and cap.

9. In a machine of the character described, the combination with a tube-carrier, a wad-supply, a device for inserting a wad into a tube in the carrier, means for reducing the end of the tube, a cap-supply, and means for placing a cap from the cap-supply onto the reduced end-portion of said tube, of a pair of devices engaging the opposite sides of the wad and cap respectively, and for compressing said wad and cap, and means for piercing the central portion of the cap and wad.

10. In a machine of the character described, the combination with a tube-carrier, a wad-supply, a device for inserting a wad into a tube in the carrier, means for reducing the end of the tube, a cap-supply, and means for placing a cap from the cap-supply onto the reduced end-portion of said tube, of a pair of devices engaging the opposite sides of the wad and cap respectively, and for compressing said wad and cap, and a piercer carried by the cap-engaging device and for piercing said cap and wad.

11. In a machine of the character described, the combination with a tube-carrier, a wad supply, a device for inserting a wad into a tube in the carrier, means for reducing the end of the tube, a cap-supply, and means for placing a cap from the cap-supply onto the reduced end-portion of said tube, of a pair of devices engaging the opposite sides of the wad and cap respectively, and for compressing said wad and cap, and means for actuating both of said devices simultaneously and in opposite directions.

12. In a machine of the character described, the combination with a tube-carrier, a wad-supply, a device for inserting a wad into a tube in the carrier, means for reducing the end of the tube, a cap-supply, and means for placing a cap from the cap-supply onto the reduced end-portion of said tube, of a pair of devices engaging the opposite sides of the wad and cap respectively, and for compressing said wad and cap, a piercer carried by the cap-engaging device and for piercing said cap and wad, a primer supply, and means for inserting a primer into the pierced cap and wad.

13. In a machine of the character described, the combination with a tube-carrier, a wad-supply, a device for inserting a wad into a tube in the carrier, means for reducing the end of the tube, a cap-supply, and means for placing a cap from the cap-supply onto the reduced end portion of said tube, of a pair of devices engaging the opposite sides of the wad and cap, a piercer carried by the cap-engaging device and for piercing said cap and wad, a primer supply, means for inserting a primer into the pierced cap and wad, and a device for backing the wad during the insertion of the primer.

14. In a machine of the character described, the combination with a rotatable carrier adapted to receive a series of tubes, and a series of devices for successively operating upon the tubes in the carrier and comprising wad-supplying means, devices for reducing the end of the tube for the reception of the cap, cap-supplying means, and means for piercing the cap and wad, of means for actuating all of said devices simultaneously.

15. In a machine of the character described, the combination with a rotatable carrier adapted to receive a series of tubes, and a series of devices for successively operating upon the tubes in the carrier and comprising wad-supplying means, devices for reducing the end of the tube for the reception of the cap, cap-supplying means, and means for piercing the cap and wad, and primer supplying means, of means for actuating all of said devices simultaneously.

16. In a machine of the character described, the combination with a rotatable carrier adapted to receive a series of tubes, a reciprocatory slide movable toward and away from the carrier, and a series of devices successively operating upon said tube, said devices comprising tube-supplying means, wad-supplying means, cap-supplying means, wad-piercing and compressing means, and primer-supplying means, all of said devices being secured to said reciprocatory slide, of a series of backing tools coöperative with the first named devices, a slide for supporting said backing tools, and means for actuating both of said slides toward and away from each other simultaneously.

17. In a machine of the character described, the combination with a rotatable carrier adapted to receive a series of tubes, a reciprocatory slide movable toward and away from the carrier, and a series of devices successively operating upon said tube, said devices comprising tube-supplying means, wad-supplying means, cap-supplying means, wad-piercing and compressing means, and primer-supplying means, all of said devices being secured to said reciprocatory slide, of a series of backing tools coöperative with the first named devices, a slide for supporting said backing tools, means for actuating both of said slides toward and away from each other simultaneously, and an ejector device controlled by the movement of the backing slide for ejecting the finished cartridge shell from the carrier.

18. In a machine of the character described, the combination with a rotatable carrier adapted to receive a series of tubes, a reciprocatory slide movable toward and away from the carrier, and a series of devices successively operating upon said tube, said devices comprising a tube-supplying means, wad-supplying means, cap-supplying means, wad-piercing and compressing means, and primer-supplying means, all of said devices being secured to said reciprocatory slide, of a series of backing tools coöperative with the first named devices, a slide for supporting said backing tools, means for actuating both of said slides toward and away from each other simultaneously, an ejector device controlled by the movement of the backing slide and for ejecting the finished cartridge shell from the carrier, said ejector device comprising a rod and an oscillatory lever connected with said rod, and means for connecting said lever and backing slide.

CHARLES A. BAILEY.

Witnesses:
ELMER G. DERBY,
CHAS. F. SCHMELZ.

Copies of this patent may be obtained for five cents each, by addressing the "Commissioner of Patents, Washington, D. C."